Dec. 19, 1944.  W. J. HUGHES  2,365,272
FILTER DISTRIBUTOR SEAL
Filed Sept. 17, 1943  3 Sheets-Sheet 2
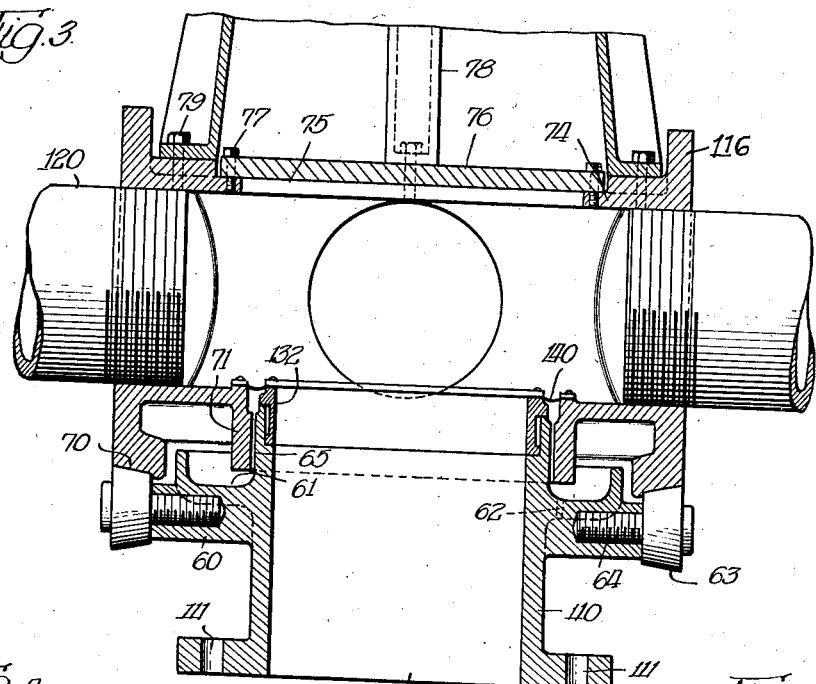
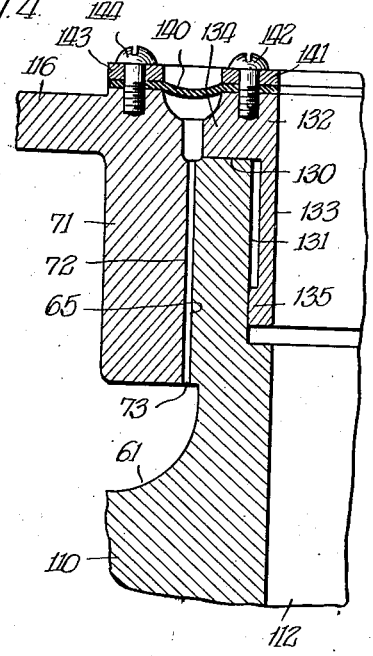
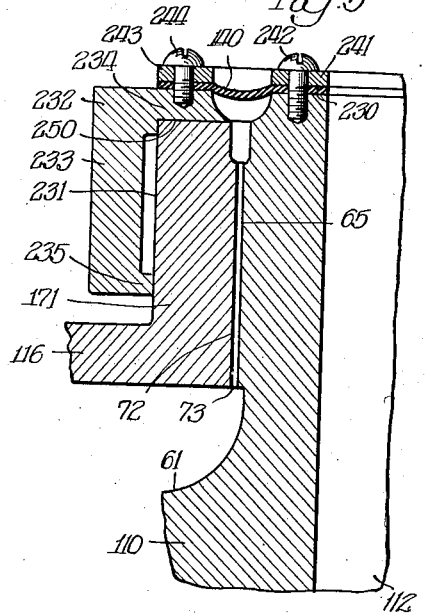
INVENTOR.
Walter J. Hughes,
BY
Robyn Wilcox
ATTY Dec. 19, 1944.   W. J. HUGHES   2,365,272
FILTER DISTRIBUTOR SEAL
Filed Sept. 17, 1943   3 Sheets-Sheet 3
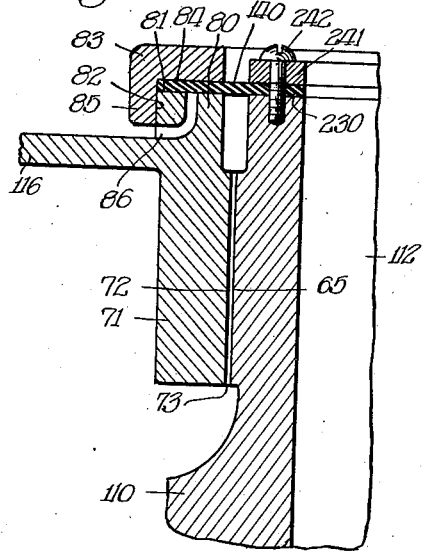
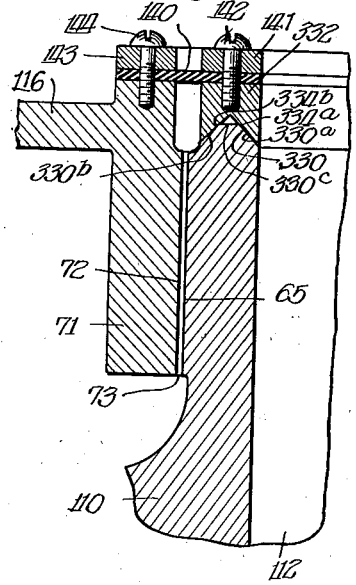
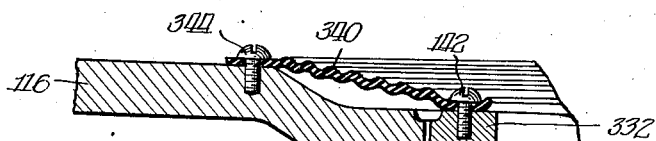
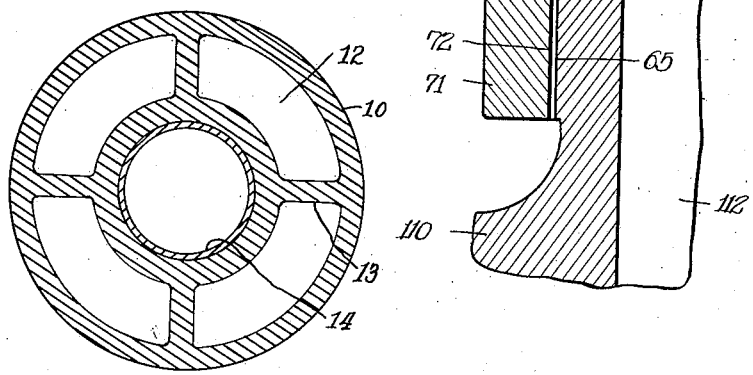
INVENTOR.
Walter J. Hughes,
BY
Robyn Wilcox
atty.

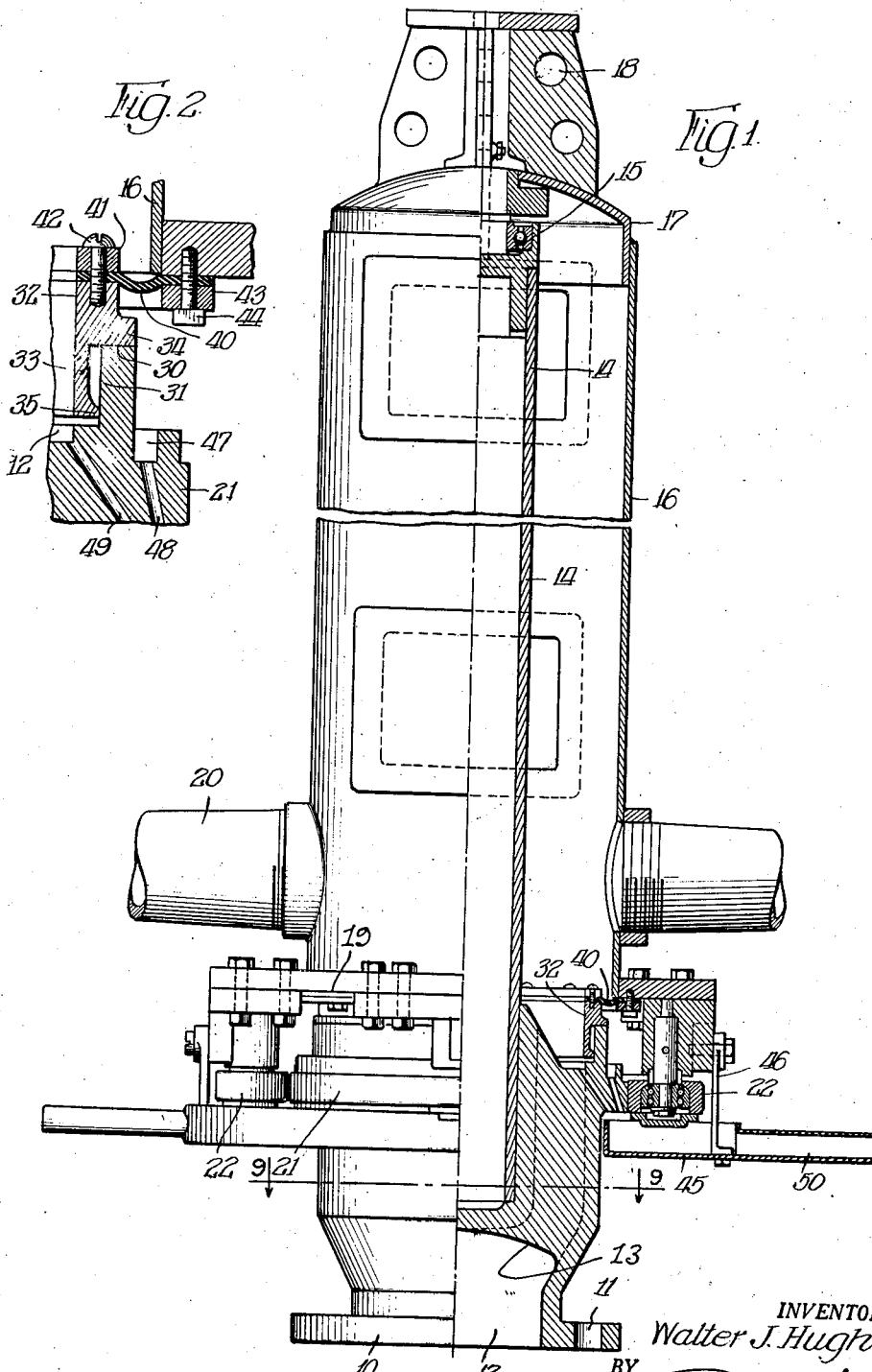

Patented Dec. 19, 1944

2,365,272

UNITED STATES PATENT OFFICE 2,365,272

FILTER DISTRIBUTOR SEAL

Walter J. Hughes, Chicago, Ill., assignor to Infilco Incorporated, Chicago, Ill., a corporation of Delaware Application September 17, 1943, Serial No. 502,844

19 Claims. (Cl. 299—69)

This invention relates to a rotatable filter distributor, and is a continuation in part of my application entitled "Filter distributor seal," Serial No. 463,446, filed October 26, 1942.

One of the objects of this invention is to provide an improved rotatable filter distributor.

Another object of this invention is to provide an improved sealing device for a rotatable filter distributor.

A further object of the invention is to provide a sealing device for a rotatable sewage distributor which does not require the use of mercury.

A still further object of this invention is to provide a sealing device for a rotatable filter distributor in which the pressure of the liquid to be distributed does not have to be carefully controlled to avoid damage to the sealing device.

Other objects of the invention will be apparent from the description and claims which follow.

In the art of liquid treatment many processes require the spraying of the liquid to be treated over a granular bed to permit purification by filtration. One of the common examples of such filtration is the treatment of sewage by the so-called trickling filter process, the sewage to be treated being sprayed over the filter bed to provide a uniform distribution of liquid thereover. The liquid distributors for such filters are of two general types: Fixed distributors in which a plurality of nozzles are placed above the filter bed, and rotating distributors in which the liquid to be filtered is introduced through a central column and distributed over the filter bed by rotating arms extending from the central column to the periphery of the bed. My invention relates specifically to the latter type of distributor and provides an improved sealing device to control leakage from the connection between the fixed portion of the column and the rotating parts thereof.

The rotating distributor customarily provides a fixed base portion which is rigidly secured to a central column in the filter bed, the liquid to be filtered entering through such base portion. Associated with the base portion is a rotating cylinder communicating with the influent conduit in the base portion and carrying a plurality of distributor arms which rotate over the bed. Obviously some method of sealing the connection between the rigid base portion and the rotating cylinder must be provided in order to prevent the flooding of the filter bed adjacent the central column. Heretofore such sealing means have usually comprised an annular channel associated with the base portion in which an extension of the upper rotating cylinder freely rotates. The channel has then been filled with mercury, giving in effect an annular U-tube, one leg of which was filled with mercury and the other with the liquid to be filtered, the weight of the mercury balancing the pressure in the conduit. There are two defects in the mercury type of sealing apparatus: The first, and most pressing at the present time, is the lack of mercury, which is a strategic material and difficult or impossible to secure for this purpose. The other defect is one of longer standing and lies in the fact that such mercury seals are lost if the pressure increases over a fixed amount, as the increased pressure of the liquid will blow the mercury out of the channel so that it becomes lost in the filter bed. It is therefore necessary in the present art to carefully control the pressure at which liquid is introduced to the filter distributor so that the mercury seal would not become damaged. One of the objects of my invention is to provide a filter seal which does not require mercury and which is not subject to damage by surges in pressure.

Briefly, the sealing device of my invention comprises a ring fitting snugly against a cylindrical wall of either the stationary base or rotating column, but free to rotate in respect thereto, and a flexible diaphragm connecting the sealing ring and the column or base respectively. As will hereinafter be described in detail, I prefer that the ring have two faces cooperating with two faces of the base or column, as the case may be, the two faces being at substantially right angles to each other. Such a construction effectively prevents leakage due to tilting or side slip of the ring. It will be obvious that such a sealing device will fit more snugly and therefore become more effective upon increase in pressure of liquid to be filtered, so that it is no longer necessary to carefully control the maximum pressure at which liquid to be filtered is introduced to the distributor. In the event the flexible diaphragm, which may be made of rubber, or the sealing ring, is damaged, it can be readily and cheaply replaced whereas the replacement of mercury seals is quite expensive. Associated with the sealing ring and diaphragm I may provide a collecting pan surrounding the base portion and immediately below the seal between the two parts of the columns. Obviously with a seal of the type I disclose there may be a small amount of leakage unless the parts are carefully made, and I utilize this leakage to distribute over the filter bed adjacent the distributor column, utilizing the usual distributor arms for the outer portion of the bed only.

The invention will be more fully understood by a reference to the drawings which show preferred embodiments of the present invention, and in which like reference characters in the several figures designate similar elements.

Figure 1 is a vertical view, partly in section, of a conventional distributor column and one embodiment of my invention associated therewith.

Figure 2 is an enlarged detail view of the sealing ring and diaphragm of the apparatus shown in Figure 1.

Figure 3 is a vertical view in section of another form of a distributor column with which my invention can be associated.

Figure 4 is an enlarged detail view in cross-section of the sealing ring and diaphragm of the apparatus shown in Figure 3.

Figure 5 is an enlarged detail view in cross-section of another embodiment of my invention.

Figure 6 is an enlarged detail view in cross-section of still a further embodiment of my invention.

Figure 7 is an enlarged detail view in cross-section of another embodiment of my invention.

Figure 8 is an enlarged cross-sectional view of a further embodiment of my invention.

Figure 9 is a cross-sectional view of the base of the distributor column shown in Figure 1, taken at the horizontal plane indicated by the line 9—9 of Figure 1.

Figure 1 illustrates my invention in a distributor of conventional design. In such apparatus the distributor comprises a base portion, such as 10, which is both a base or support for the rotating portion of the column and also an inlet conduit for the liquid to be treated. The base 10, often a casting, is rigidly affixed, as by bolts inserted in bolt holes 11, to a suitable foundation such as a concrete column rising through the filter bed, not shown. The casting is usually cylindrical in shape so as to provide a conduit or channel 12 for conducting the flow of liquid to the rotating portion. The base castings of conventional distributors are provided with a spider 13 in the upper portion of the casting carrying a support 14 for a suitable thrust bearing 15 for supporting the upper or rotating portion 16 of the distributor column. The upper cylinder 16 is closed at its upper end as by top 17, and may be provided with eyes 18 in which to secure guy rods or cables, not shown, to assist in supporting the outer end of the distributor arms. As is well known, the upper part of the distributor column 16 acts as a surge chamber to equalize normal fluctuations in head of liquid flowing to the distributor. The lower end of the rotating cylinder 16 terminates, as at 19, in a plane adjacent to the upper edge of the base casting. A plurality of distributor arms 20 are fitted into the rotatable cylinder 16 so that liquid flowing from the base portion passes into the rotating cylinder and out the distributor arms for distribution. It is also customary to provide in apparatus of this type a circular roller path 21 on the base portion with which are associated a plurality of rollers 22 attached to the rotating cylinder so that the rotating column will at all times be maintained in an upright position. The distributing column heretofore described is not new and is not claimed.

In the apparatus of my invention, the upper edge 30 and the adjacent inner wall 31 of the base 10 should be machined to present a smooth surface for cooperation with the sealing ring 32. Preferably the inner wall 31 is recessed in the conduit 12, as shown, so that when the sealing ring 32 is in place there will be no portion of the ring projecting out into the conduit to disturb flow therethrough. The sealing ring 32 is provided with a cylindrical wall 33 to fit freely within the inner wall 31 of the base 10 and an outwardly extending horizontal end flange 34, adapted to be seated upon the top edge 30 of the base. Preferably, the lower end of the cylindrical portion 33 of the sealing ring 32 is provided with an outstanding wall flange 35, fitting snugly against the inner wall 31 of the casting, so as to provide a non-tilting sealing ring. The outer vertical surface of the wall flange 35 and the bottom horizontal surface of the end flange 34 should likewise be machined, and be of such size as to fit snugly against the respective wall and end, 31 and 30, of the base casting, yet loosely enough to be easily rotated therein. A flexible diaphragm 40, such as one made of rubber or neoprene, is rigidly secured with a water-tight joint to the sealing ring 32, as by ring 41, rigidly secured to the sealing ring, as by machine screws 42, and also to the rotatable cylinder 16, as by ring 43 and bolts 44. It is very desirable that the diaphragm be flexible as well as impermeable so that the sealing ring 32 may move relative to the rotating cylinder 16 and at all times be in close contact with the upper portion of the base 10. It will be obvious that as the rotatable cylinder 16 revolves, ordinarily due to the pressure created by the force of discharge jets, not shown, in the distributor arms 20 or by other means, the sealing ring 32 will rotate with it and provide a substantially water-tight joint adjacent the base 10. It will also be obvious that as the pressure in the liquid in the distributor increases, the pressure against the sealing ring 32 will also increase to force it more strongly against the end wall 30 of the base portion 10. Thus the sealing device of my invention operates more efficiently with increased pressure and it is not necessary to carefully limit the maximum pressure at which liquid is forced into the distributor.

In my invention I may provide an annular collecting pan 45, adjacent the outer wall of the base 10, so as to collect any leakage by the sealing ring 32 and to distribute the same uniformly over the filter adjacent the central column. Such a collecting pan 45 can be formed integral with the base portion, but I prefer to provide a separate pan as shown and suspend it from the rotating cylinder 16 by any suitable means such as links 46. Preferably the collecting pan 45 will be located on a level below the roller path 21. I also prefer that the roller path 21 be in the form of an outwardly extending flange from the base 10 in which case I provide a channel 47 in the upper surface of the roller path, whereby liquid leaking through the seal will be collected therein rather than come in direct contact with the rollers 22. I then provide a plurality of small ducts 48 leading from the channel 47 in the upper surface of the roller path through the flange to the lower surface thereof, whereby the liquid collected in the channel is discharged directly into the annular pan 45. In view of the fact that the distributor nozzles, not shown, on the large distributor arms 20 may not be located adjacent to the central column and that the distribution of liquid adjacent to the column is secured by liquid escaping by the seal 32 and caught in the distributing pan 45, it is sometimes desirable to provide a fixed flow orifice or duct 49 through the wall of the base casting 10 to provide a sufficient amount of liquid to the collecting pan 45. While it might be presumed that sufficient liquid would escape by the seal above described, I have found in actual installations this is ordinarily not true. I may, therefore, provide one or two small ducts 49 through the wall in order to provide a suitable amount of liquid for distribution around the center column. The collecting pan 45 is provided with suitable discharge orifices, such as pipes 50, to distribute liquid collected therein uniformly over the filter bed adjacent to the column.

The operation of the invention will be readily understood. As liquid is forced into the central column and into the distributing arms, it will force the sealing ring 32 down upon the upper edge 30 of the base 10, thereby providing a very effective liquid seal. The rotation of the cylinder 16, usually provided by the reactive effect of the jets in the distributor arms, will carry the sealing ring 32 around with it. The flexible diaphragm 40 between the sealing ring and the rotating cylinder permits the sealing ring to seat tightly against the base casting at all times, regardless of minor tilting in the cylindrical or rotatable upper column 16. A slight amount of liquid may leak past the sealing ring 32 and be collected in the channel 47 and be conducted therefrom by ducts 48 into the annular pan 45, from which it is then distributed over the filter bed adjacent to the central column.

Figures 3 and 4 illustrate my invention in a new and improved type of distributor, which differs somewhat from the customary distributor although it has the two principal elements of a stationary base and a rotating chamber which provides communication between the stationary base and the distributor arms. In my improved structure I have a base 110, which as in the conventional style is both a support for the rotating portion of the column and also forms an inlet conduit for the sewage to be treated. Such a base 110 is rigidly affixed by any suitable means such as bolts, not shown, inserted in bolt holes 111 to any suitable foundation, not shown. This base, which is ordinarily a casting, is cylindrical in shape to provide for a conduit 112 for the inflow of liquid to be distributed. I prefer that such a casting be provided with a flange 60 on the outer edge thereof, the upper side of which is provided with a channel 61 to collect any leakage of liquid by the sealing members hereinafter described. Such a collecting channel 61 can be provided with suitable outlet such as duct 62, for discharging collected liquid therefrom. I also provide a plurality of roller bearings 63, mounted for vertical rotation on shafts 64, carried by the flange 60. I also prefer to provide a rather wide machined face 65 adjacent the upper edge of the casting, and on the outer wall thereof. I also prefer to provide a machined or smooth surface at the upper end 130 of the casting and a recessed and machined inner wall 131, as shown in Figure 4, for the sealing ring hereinafter described.

Associated with the base portion I provide a rotating chamber or column 116, which carries the distributing arms 120. The rotating chamber is provided with a circular track 70 so arranged as to ride upon the roller bearings 63, whereby the rotating chamber 116 and its associated distributor arms 120 may be rotatably supported in respect to the base 110. I also provide a flange 71, extending downwardly from the chamber 116 parallel and closely adjacent to the machined wall 65 of the base 110. Preferably the inner face 72 of the flange 71 will be machined to provide a smooth face separated from the machined face 65 of the base by a minute space 73. The purpose of the inner flange 71 and the associated machined face 65 of the base is to limit any tilting of the rotating portion. As these two faces are machined, they provide a sliding contact one with another, and as they are separated by a very minute space 73, it is obvious that any tilting of the rotating distributor arms such as by an unexpected load placed upon one of the arms, tilting due to high wind and the like, will cause a corresponding tilting of the inner flange 71, which will immediately contact the cooperating face 65 of the base portion at the lower extremity thereof. This flange and its corresponding portion of the base therefore will prevent any unreasonable tilting of the distributor system. As shown in the drawings in Figure 3, the rotating chamber 116 need be only high enough to hold the distributing arm 120. In using a distributor seal such as I propose, fluctuations in head are not as obnoxious as in a filter using a customary mercury seal. While there is no objection to providing a surge chamber above the distributor arms, I find that with my seal it is not necessary to do so and Figure 3 shows a structure in which such a chamber has been eliminated. As shown in the drawings in Figure 3, the top 74 of the rotating chamber is at a level adjacent the top of the distributor arms 120. As it is sometimes necessary to replace the seal diaphragm, I prefer to provide an opening 75 in the top 74 of the distributing chamber 116. As shown in the drawings, I prefer that the diameter of the opening 75 be greater than the diameter of any of the portions of the seal assembly so that all parts thereof can readily be inserted or removed. The opening 75 is closed by any suitable means such as plate 76 secured to the rotating distributing chamber 116 by any suitable means such as bolts 77. I also provide on the top of the rotating distributing chamber 116, a framework 78 attached to the rotating chamber by any siutable means such as bolts 79, to provide an anchor for the guys necessary to support the outer ends of the distributing arms 120. The framework 78 can be made of any suitable material and can be in any suitable form, such as an A-frame or the like, as will be evident to those skilled in the art.

A sealing assembly, such as that shown in Figure 1 and Figure 2 may be used to provide the liquid seals between the stationary base portion 110 and the rotating distributing chamber 116. Such a sealing assembly can comprise a sealing ring 132, which is provided with a cylindrical wall 133 of a size to fit freely within the inner wall 131 of the base 110. An outwardly extending end flange 134 is seated upon the end 130 of the base 110 and forms a substantially water-tight liquid seal. At the lower end of the cylindrical portion 133, is a wall flange 135, which fits snugly against the inner wall 131 of the base, so as to prevent tilting of the sealing ring, but to permit ready rotation of the ring in respect to the base. A flexible diaphragm 140 is rigidly secured to the sealing ring 132 in a water-tight joint, as that provided by a ring 141 attached to the sealing ring 132 by any suitable means such as machine screws 142. The peripheral edge of the diaphragm 140 is rigidly secured to the rotating chamber 116 in a water-tight joint by any suitable means, such as an annular ring 143 secured to the wall of the rotating chamber 116 by any suitable means such as machine screws 144.

The operation of the distributor utilizing the sealing assembly of Figures 3 and 4 would be substantially the same as that of the apparatus shown in Figures 1 and 2 and such a description need not be repeated.

Figure 5 illustrates another embodiment of my invention and in most respects it is similar to the sealing assembly, shown in Figure 4. In this embodiment, however, the sealing diaphragm is rigidly secured to the stationary base portion 110 and the sealing ring is held firmly against the flange 171 of the rotating distributing chamber 116. In the embodiment shown in this figure, the inner edge of the diaphragm 140 is rigidly secured with a water-tight seal to the upper end 230 of the base portion 110 by any suitable means such as a ring 241 rigidly secured to the base 110 by machine screws 242. The peripheral edge of the diaphragm 140 is firmly secured in a water-tight seal to the sealing ring 232 by any suitable means such as a clamping ring 243 affixed to the sealing ring 232 by machine screws 244. The sealing ring 232, as in the other embodiment comprises a cylindrical portion 233 provided with a horizontally extending portion or end flange 234, which rides upon the upper end 250 of the flange 171. The sealing ring 232 is also provided with a wall flange 235 at the lower end of the cylindrical portion 233, which rests against the inner wall 231 of the flange 171. Obviously the end 250 and the inner wall 231 of the flange 171 will be carefully machined as will those parts of the associated flanges 234 and 235, which are in rubbing contact therewith. In the embodiment shown in this figure the diaphragm is rigidly secured to the base portion and the sealing ring is in rubbing contact with the inner flange 171 of the rotating chamber 116. The end flange 234 forms the liquid seal with the end 250 of the flange and the lower wall flange 235, due to its contact with the wall 231 of the flange prevents tilting of the ring, otherwise the operation is the same as in the previous figure.

Figure 6 illustrates another embodiment of my invention which is quite similar to that disclosed in Figure 5. In this embodiment the diaphragm 140 is rigidly secured to the stationary base 110, as by ring 241 and machine screws 242. The revolving distributor chamber 116 is provided with the downwardly extending anti-tilting flange 71 and also with an inner wall or flange 80, which extends upwardly to a horizontal face 81, which is level with the upper edge 230 of the base portion 110. The upper edge or face 81 will be machined to provide a smooth sliding surface. The peripheral edge 82 of the upstanding flange 80 will also be machined to provide a smooth surface. In this form, the diaphragm 140 will be of a size sufficient to cover the surface of the upper edge of the flange 80 and the space between that flange and the upper part 230 of the base portion, and will be non-rigidly held in place by an annular L shaped ring weight 83. Weight 83 will have a horizontal portion provided with a lower face 84, adapted to rest upon the diaphragm 140, which in turn rests upon the upstanding flange 80. The ring weight 83 is also provided with a downwardly extending portion 85, which is adapted to fit rather snugly against the machined peripheral face 82 of the flange 80. The vertical extension 85 of the ring weight is necessary to prevent tilting or side slip of the ring, and to hold it in place upon the diaphragm 140 and the surface 81 upon which it rides. If desired, one or more ducts 86 can be drilled to provide communication between the upper face 81 of the upper edge of flange 80 and the interior of the distributing chamber 116, so that liquid from the distributing chamber can lubricate the lower surface of the diaphragm 140, where it is in sliding contact with the upper face 81 of the upstanding flange 80.

Figure 7 illustrates a further embodiment of my invention in which the diaphragm 140 is rigidly secured to the revolving distributing chamber 116 by ring 143 and machine screws 144. In this modification, as in the modification shown in Figures 1 to 4 respectively, the inner edge of the diaphragm 140 is rigidly affixed to a sealing ring 332 as by clamping ring 141 and machine screws 142. This embodiment differs from the other in the shape of the sealing ring 332 and of the cooperating upper edge 330 of the base 110. In this embodiment the upper edge 330 of the base is formed to provide intersecting surfaces, 330a and 330b, as shown. These surfaces, 330a and 330b, intersect at any suitable angle, shown in the figure as about 90 degrees, although such an angle could be somewhat larger or smaller if desired. Obviously the two surfaces, 330a and 330b, will be machined to provide slipping faces. I also prefer that the tip of the angle formed by the two surfaces be removed as shown at 330c to avoid a knife-like edge on which the sealing ring would ride, thereby permitting the cooperating faces 334a and 334b of the sealing ring 332 to ride smoothly upon the angular upper edge 330 of the base 110. The construction shown in this figure prevents side slipping of the sealing ring 332 in either direction and also provides for a sealing surface or surfaces upon which the sealing ring can form a substantially water-tight seal.

Figure 8 illustrates another embodiment of my invention. In this embodiment I use a flexible spring metal diaphragm 340 which may be rigidly attached to either the base or rotating distributing chamber, as desired, but which is shown as being rigidly secured by machine bolts 344 to the distributing chamber 116.

Such a flexible metal diaphragm can be constructed of any suitable material, such as spring bronze, and preferably will be corrugated. Such a metallic diaphragm will be of truncated conical shape, preferably with annular corrugations therein to facilitate vertical flexing of the diaphragm. The inner edge of the diaphragm is attached to a sealing ring 332, which for purposes of illustration only is shown in the same form as that described in Figure 7. The use of a conical diaphragm is preferred when a metallic diaphragm is used in order to provide for spring action which forces the sealing ring against the cooperating face, in this case the upper edge 330 of the base 110. In this embodiment it will be noted that the diaphragm is not only flexible but also acts as a spring to hold the sealing ring in place. This permits use of a lighter sealing ring and will be desirable in some installations. It is obvious that the apparatus would work equally well if the diaphragm were attached to the base portion and the outer edge was in pressure contact with the rotating distributor chamber 116, in which case the end of the base portion 330 would preferably be higher than the floor of the rotating chamber, against which the diaphragm rests. With the use of a metallic diaphragm it is preferred that the spring action of the diaphragm exert a force downwardly on the edge to which the ring is attached, so as to always form a pressure contact with the corresponding portion of the distributor.

It will be seen from the various embodiments illustrated that I avoid the use of the customary mercury seal and provide a substantially watertight seal that is increasingly effective with increased pressures and which cannot be broken by rapid fluctuation in liquid being distributed. Obviously in all forms of my invention it is preferable that the sealing assembly do not extend out into the flow passage 112 in the stationary base, for which reason the walls of the flow passage 112 are recessed when the sealing ring is in sliding contact with the base portion. It will also be obvious that the sealing device of my invention comprises a flexible diaphragm rigidly secured to either the stationary base portion or the rotating distributor chamber and held in pressure contact with the other member (rotating distributing chamber or base portion respectively) by any suitable means such as the weight of the sealing ring described or by the spring effect of the diaphragm. It is necessary that the sealing ring be provided with two surfaces meeting at a substantial angle so as to provide a sealing contact on at least one surface and to prevent tilting of the sealing ring with respect to the portion in which it is in sliding contact. Thus the tilting of the distributor which is apt to occur in all rotating distributors, even with limiting devices such as those shown, is taken up or absorbed by the flexible diaphragm which is forcibly held in a sealing contact with one portion of the assembly and rigidly secured to the other.

It will be seen that the device of my invention provides a sealing ring for a rotating distributor which is remarkably efficient and which avoids the use of mercury sealing traps. While there may be some leakage past the sealing ring this is slight and may even be desired in order to provide for a uniform distribution of liquid adjacent to the central column. As indicated above it is sometimes necessary to provide extra ducts 49 through the wall of the base casting in order to provide sufficient liquid for this purpose.

Manifestly many modifications and variations of the invention hereinbefore set forth may be made by persons skilled in the art without departing from the spirit and scope thereof. It is to be understood that while best results will probably be obtained with the constructions and arrangements shown, these are to be taken as preferred embodiments, only, of the invention and that minor changes coming within the scope of the subjoined claims may be included within the sphere hereof.

I claim:

1. In a liquid distributor comprising a base member, a liquid inlet conduit extending through said base member, a rotatable chamber carried by said base member, and distributor arms communicating with said rotatable chamber and adapted to discharge liquid therefrom, a sealing member comprising a cylindrical ring within the outlet portion of said inlet conduit and so constructed and arranged as to fit snugly within said portion but to rotate easily therein, said ring having a flanged portion extending outwardly across the end of a wall of said inlet conduit, and a diaphragm connecting said sealing ring and said rotatable member.

2. A rotatable liquid distributor comprising a stationary base member, a liquid inlet conduit extending through said base member and having a cylindrical wall, a rotatable chamber carried by said base member, distributor arms affixed to said rotatable chamber and adapted to received liquid from said rotatable chamber and to discharge same over a surface removed from the base portion, a sealing ring bearing against said cylindrical wall and so constructed and arranged as to fit snugly within said conduit but to rotate therein, a flexible diaphragm connecting said sealing ring and said rotatable chamber, and means for collecting leakage from between said sealing ring and said inlet conduit and distributing the same adjacent said base portion.

3. A rotatable liquid distributor comprising a stationary base member, a cylindrical bore through said base member forming therein a liquid inlet conduit, a rotatable chamber carried by said base member, distributor arms leading from said rotatable chamber and adapted to discharge liquid therefrom, a sealing member comprising a cylindrical ring within the outlet portion of said inlet conduit and so constructed and arranged as to fit snugly within said portion but to rotate easily therein and a flexible diaphragm connecting said sealing ring and said rotatable chamber, an annular collecting channel surrounding said base member below said outlet portion and so constructed and arranged as to catch liquid leaking between said sealing ring and said base portion, and discharge outlets from said annular channel.

4. In a liquid distributor including a base portion, a liquid inlet conduit in said base portion, a rotatable member carried by said base portion and outlet arms affixed to said rotatable member, an improved liquid sealing member comprising a rotatable sealing ring fitting snugly within said inlet conduit, a flexible diaphragm connecting said sealing ring and said rotatable member, a liquid collecting channel surrounding said base portion below said sealing ring, and outlet means from said channel.

5. In a liquid distributor including a base portion, a liquid inlet conduit in said base portion, a rotatable member carried by said base portion and outlet arms affixed to said rotatable member, an improved liquid sealing member comprising a rotatable sealing ring provided with a cylindrical portion adapted to rotate freely within said liquid inlet, an outstanding flange at one end of said cylindrical portion adapted to contact the inside of the wall of said liquid inlet conduit and an outstanding flange on the other end of said cylindrical portion adapted to rest upon the end of the wall of said liquid inlet conduit, and a flexible diaphragm connecting said sealing ring and said rotatable member.

6. In a liquid distributor including a base portion, a liquid inlet in said base portion, a rotatable member carried by said base portion, outlet arms affixed to said rotatable member, and a sealing device associated with said base portion and said rotatable member, an improved means for controlling the discharge of leakage around the base member comprising an annular collecting channel surrounding said base portion below said sealing member, means for conducting leaking liquid from the outside of said base portion into said collecting channel, and liquid outlet means from said collecting channel.

7. In a liquid distributor including an inlet member and a distributing member relatively rotatable to said inlet member, an improved liquid sealing means between said members comprising a cylindrical wall in one of said members, a ring supported by the end of said wall and fitting snugly along a face of said wall but being free to rotate relative thereto, and a flexible diaphragm connecting said ring and the other of said members.

8. A seal for a rotatable liquid distributor wherein liquid to be distributed enters through a fixed inlet and is discharged from a rotatable outlet, which comprises a ring member having a flanged portion adapted to fit snugly within said inlet but rotate freely therein and a flexible diaphragm connecting said ring and said rotatable outlet.

9. In a liquid distributor including an inlet member and a distributing member relatively rotatable to said inlet member, an improved liquid sealing means between said members comprising a cylindrical wall in one of said members and having two faces meeting at a substantial angle, a sealing ring having two faces corresponding to the faces of said wall and rotatable relative thereto, said ring being supported by said wall, and a flexible diaphragm slidably joined by said ring to said cylindrical wall and rigidly secured to the other of said members.

10. The apparatus of claim 9 wherein the diaphragm at its peripheral edge is rigidly secured to the rotatable chamber and the ring is affixed to the inner edge of said diaphragm and is in sliding contact with said base portion.

11. The apparatus of claim 9 wherein the diaphragm at its inner edge is rigidly secured to the base portion and the ring is affixed to the peripheral edge of said diaphragm and is in sliding contact with the rotatable chamber.

12. In a liquid distributor of the type comprising a base member, a rotatable distributor member carried by said base member, a liquid inlet channel extending through said base member, and distributor arms leading from said rotatable member, a sealing ring having two faces meeting at a substantial angle and rotatably bearing against a wall of one of said members, said wall having two faces corresponding to the faces of said ring, an annular flexible diaphragm operatively connected to the other of said members and to said sealing ring, an annular collecting channel surrounding said base member below the upper end of said inlet and so constructed and arranged as to catch liquid leaking between said sealing ring and said wall, and discharge outlets from said annular channel.

13. In a liquid distributor including a stationary base member, an inlet channel in said base member having a cylindrical wall, and a distributing member relatively rotatable to said base member, an improved liquid sealing device comprising a ring bearing against the end of said wall and having a flange fitting snugly along a face of said wall but free to rotate relative thereto, and a flexible diaphragm affixed to said ring and to the distributing member.

14. In a liquid distributor including a stationary base member, a liquid inlet channel in said base member, a rotatable distributor chamber carried by said base member, and a cylindrical wall within said distributor chamber concentric with said inlet, an improved sealing device comprising a sealing ring bearing against the end of said wall and having a depending flange fitting snugly along the side of said wall, and an annular flexible diaphragm rigidly secured to said base portion and to said sealing ring.

15. In a liquid distributor comprising a base member, an inlet channel extending through said base member, a rotatable distributor member carried by said base member and communicating with said inlet channel, and distributor arms leading from said rotatable member, a sealing means comprising a sealing ring supported by one of said members, and having two intersecting faces, said supporting member having two intersecting surfaces corresponding to and cooperating with said sealing ring, and an annular flexible diaphragm connecting the other of said members and said sealing ring.

16. In a liquid distributor comprising a base member, a liquid inlet channel extending through said base member, and a rotatable distributing chamber carried by said base member, said distributing chamber having a vertically extending wall adjacent the wall of said base member, improved sealing means comprising a ring extending across the vertically extending wall of the rotatable chamber so constructed and arranged as to ride upon the top of said wall, said ring having a flange portion extending downwardly along said wall, and a diaphragm rigidly secured at one edge to said base member and slidably secured at the other edge to the rotatable chamber by said ring.

17. A liquid distributor comprising a base member having a liquid inlet conduit therethrough and a rotatable member carried by said base member and adapted to receive liquid therefrom, a vertical cylindrical wall portion on the outside of said base member, an inner cylindrical wall portion on said rotatable member and lying closely adjacent to said first wall portion, a seal assembly joining said wall portions and comprising a sealing ring bearing against the upper end of the said cylindrical wall of one of said members, said sealing ring having a depending flange portion concentric and lying closely adjacent to the side of the said cylindrical wall, and a flexible diaphragm affixed to said ring and other of said members, horizontally extending distributor arms leading from said rotatable member, and a removable top closure plate adjacent said distributor arms, said plate being of larger diameter than any of the portions of said seal assembly.

18. In a distributor including a stationary base member and a rotatable distributing member positioned to receive liquid from said base member, said members having concentric wall portions, one of said wall portions having two faces meeting at a substantial angle, a sealing means bridging the space between said concentric wall portions and comprising a sealing ring having two faces corresponding to the faces of said one wall portion and being slidably supported by and fitting snugly against said one wall portion, and an annular flexible diaphragm joining the other of said members to said sealing ring.

19. In a liquid distributor including a stationary inlet member and a rotatable distributing member, one of said members having a cylindrical wall portion having two faces meeting at a substantial angle, an improved liquid sealing means between said members comprising a sealing ring having two faces corresponding to two faces of said wall portion, and a flexible annular diaphragm slidably secured at one edge to said wall portion by said ring and rigidly secured at the other edge thereof to the other of said members.

WALTER J. HUGHES.